US011536355B2

(12) United States Patent
Brubaker et al.

(10) Patent No.: US 11,536,355 B2
(45) Date of Patent: Dec. 27, 2022

(54) SEGMENTED SPRING FOR A BALL SCREW

(71) Applicants: Koyo Bearings North America LLC, Greenville, SC (US); JTEKT Corporation, Aichi-ken (JP)

(72) Inventors: Justin K. Brubaker, Greenville, SC (US); Gento Aramoto, Osaka (JP)

(73) Assignees: Koyo Bearings North America LLC, Greenville, SC (US); JTEKT Corporation, Aichi-ken (JP)

( * ) Notice: Subject to any disclaimer, the term of this patent is extended or adjusted under 35 U.S.C. 154(b) by 0 days.

(21) Appl. No.: 17/003,504

(22) Filed: Aug. 26, 2020

(65) Prior Publication Data

US 2021/0062899 A1    Mar. 4, 2021

Related U.S. Application Data

(60) Provisional application No. 62/892,618, filed on Aug. 28, 2019.

(51) Int. Cl.
*F16H 25/20* (2006.01)
*F16H 25/22* (2006.01)
*F16H 25/24* (2006.01)

(52) U.S. Cl.
CPC ..... *F16H 25/2204* (2013.01); *F16H 25/2454* (2013.01); *F16H 2025/2062* (2013.01); *F16H 2025/249* (2013.01)

(58) Field of Classification Search
CPC .......... F16H 25/2238; F16H 2025/249; F16H 2025/2062; F16H 25/2454; F16H 25/2204
See application file for complete search history.

(56) References Cited

U.S. PATENT DOCUMENTS

| 2016/0033018 | A1  | 2/2016 | Tashiro |
| 2016/0033019 | A1* | 2/2016 | Aramoto ............. F16H 25/2238 74/424.81 |
| 2020/0200245 | A1* | 6/2020 | Zinnecker ........... F16H 25/2214 |

FOREIGN PATENT DOCUMENTS

| DE | 10 2009 012 235 A1 | 9/2009 |
| DE | 10 2013 202 099 A1 | 6/2014 |
| DE | 10 2015 201 257 B3 | 7/2016 |
| EP | 2414698 B1 | 2/2012 |
| JP | H11-107503 A | 4/1999 |
| JP | 2004-120890 A | 4/2004 |
| JP | 2016-035322 A | 3/2016 |
| JP | 2016-44 685 A | 4/2016 |
| JP | 2018-168926 A | 11/2018 |
| WO | 2010112338 A1 | 10/2010 |
| WO | 2015022224 A2 | 2/2015 |

* cited by examiner

*Primary Examiner* — Randell J Krug
(74) *Attorney, Agent, or Firm* — Nelson Mullins Riley & Scarborough LLP

(57) ABSTRACT

A ball screw assembly having a ball nut including a first end, a second end, a central bore, and a ball track defined by the inner surface, a ball screw shaft including an outer surface defining a ball track, the ball screw shaft being disposed in the central bore so that the ball tracks form a ball raceway, a first stopper disposed within the ball raceway, a plurality of main balls forming a ball train, the ball train being disposed in the ball raceway, and a main spring assembly disposed in the ball raceway between a first end of the ball train and the first stopper, wherein a spring constant of the first spring portion is greater than a spring constant of the second spring portion.

18 Claims, 7 Drawing Sheets

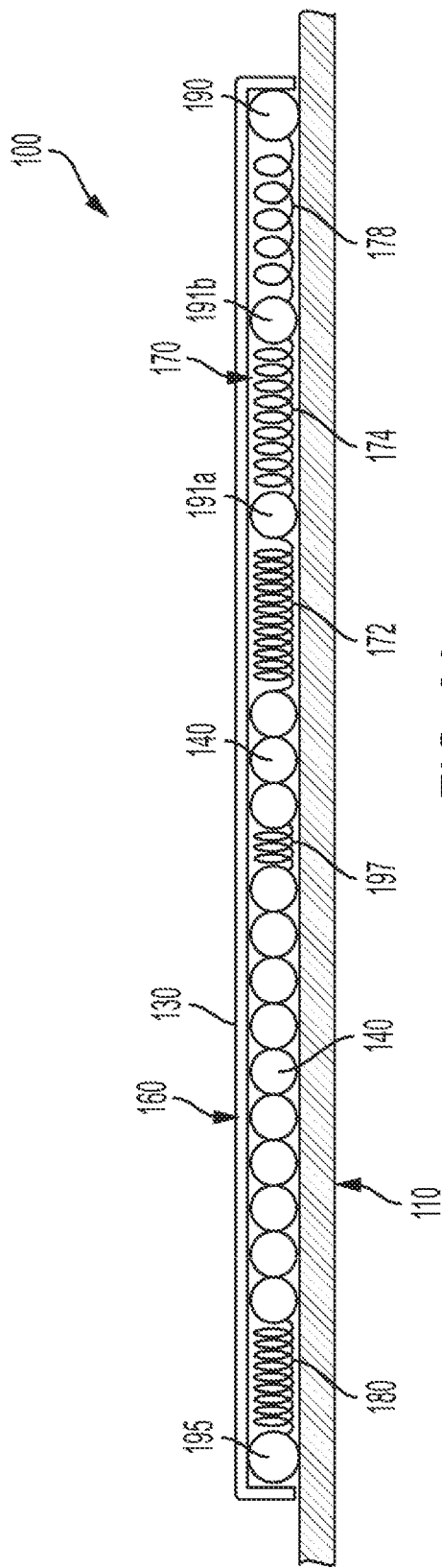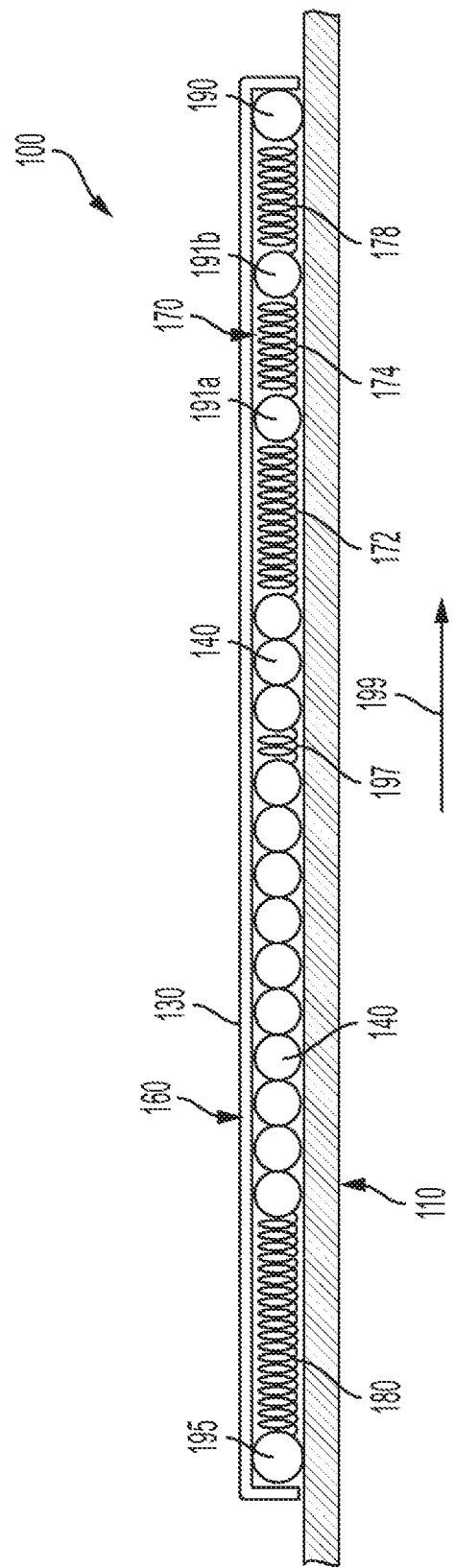

SEGMENTED SPRING FOR A BALL SCREW

CLAIM OF PRIORITY

This application claims priority to U.S. provisional patent application No. 62/892,618 filed Aug. 28, 2019, the disclosure of which is incorporated by reference herein.

FIELD OF THE INVENTION

The present invention relates generally to mechanical linear actuators. More particularly, the present invention relates to designs and assembly methods of ball screw assemblies.

BACKGROUND OF THE INVENTION

Known ball screw assemblies often include a ball train interposed between a ball track formed in an outer surface of a ball screw shaft and a ball track formed in an inner surface of a ball nut. Typically, a coil spring is interposed between a ball at an end of the ball train and a stop formed on the ball nut. In such a non-circulating ball screw assembly, the coil spring does not contract when the ball screw shaft is rotationally driven with a low axial load imposed on the ball screw shaft. Thus, the balls in the ball train do not move relative to the ball nut. Therefore, the ball screw moves with the balls in the ball train sliding on the ball screw shaft.

However, when the ball screw is rotationally driven with a high axial load imposed on the ball screw shaft, the coil spring contracts to allow the ball screw to move with the balls rolling with respect to both the ball nut and the ball screw shaft. Thus, efficient screw power transmission is achieved.

As noted, the coil spring is housed in the raceway between the ball screw shaft and the ball nut. Thus, when the ball screw shaft is rotationally driven with a high axial load, the shape of the coil spring is likely to be distorted. The helically mounted coil main spring on a non-recirculating ball screw does not typically compress evenly along its entire length. In operation, the load end of the spring adjacent the ball train compresses more than the support/stop end. This causes higher stresses in the load end, thereby leading to fatigue failure earlier than if the spring were evenly compressed over its entire length. The cause of the uneven loading is friction between the coils and support structure in the mounting arrangement.

The present invention recognizes and addresses considerations of prior art constructions and methods.

SUMMARY OF THE INVENTION

One embodiment of the present disclosure provides a ball screw assembly having a ball nut including a first end, a second end, an inner surface defining a central bore, and a ball track defined by the inner surface, a ball screw shaft including an outer surface defining a ball track, the ball screw shaft being disposed in the central bore so that the ball track of the ball nut and ball track of the ball screw form a ball raceway, a first stopper disposed at the first end of the ball nut within the ball raceway, a plurality of main balls forming a ball train, the ball train being disposed in the raceway, and a main spring assembly including a first spring portion and a second spring portion, the main spring assembly being disposed in the raceway between a first end of the ball train and the first stopper, wherein a spring constant of the first spring portion is greater than a spring constant of the second spring portion.

Another embodiment of the present disclosure provides a brake assembly having a caliper including an arm portion, a piston disposed within the caliper, the piston being axially movable along a longitudinal center axis of the piston, a first brake pad affixed to the arm portion of the caliper, a second brake pad affixed to an end surface of the piston, a brake disc disposed between the first brake pad and the second brake pad, and a ball screw assembly including a ball nut including a first end, a second end, an inner surface defining a central bore, and a ball track defined by the inner surface, a ball screw shaft including an outer surface defining a ball track, the ball screw shaft being disposed in the central bore so that the ball track of the ball nut and ball track of the ball screw form a ball raceway, a first stopper disposed at the first end of the ball nut within the ball raceway, a plurality of main balls forming a ball train, the ball train being disposed in the ball raceway, and a main spring assembly including a first spring portion and a second spring portion, the main spring assembly being disposed in the ball raceway between a first end of the ball train and the first stopper, wherein a spring constant of the first spring portion is greater than a spring constant of the second spring portion.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which;

FIGS. 6A and 6B are schematic views of the ball screw assembly shown in FIG. 1 in a neutral state and a loaded state, respectively.

Figure 1:
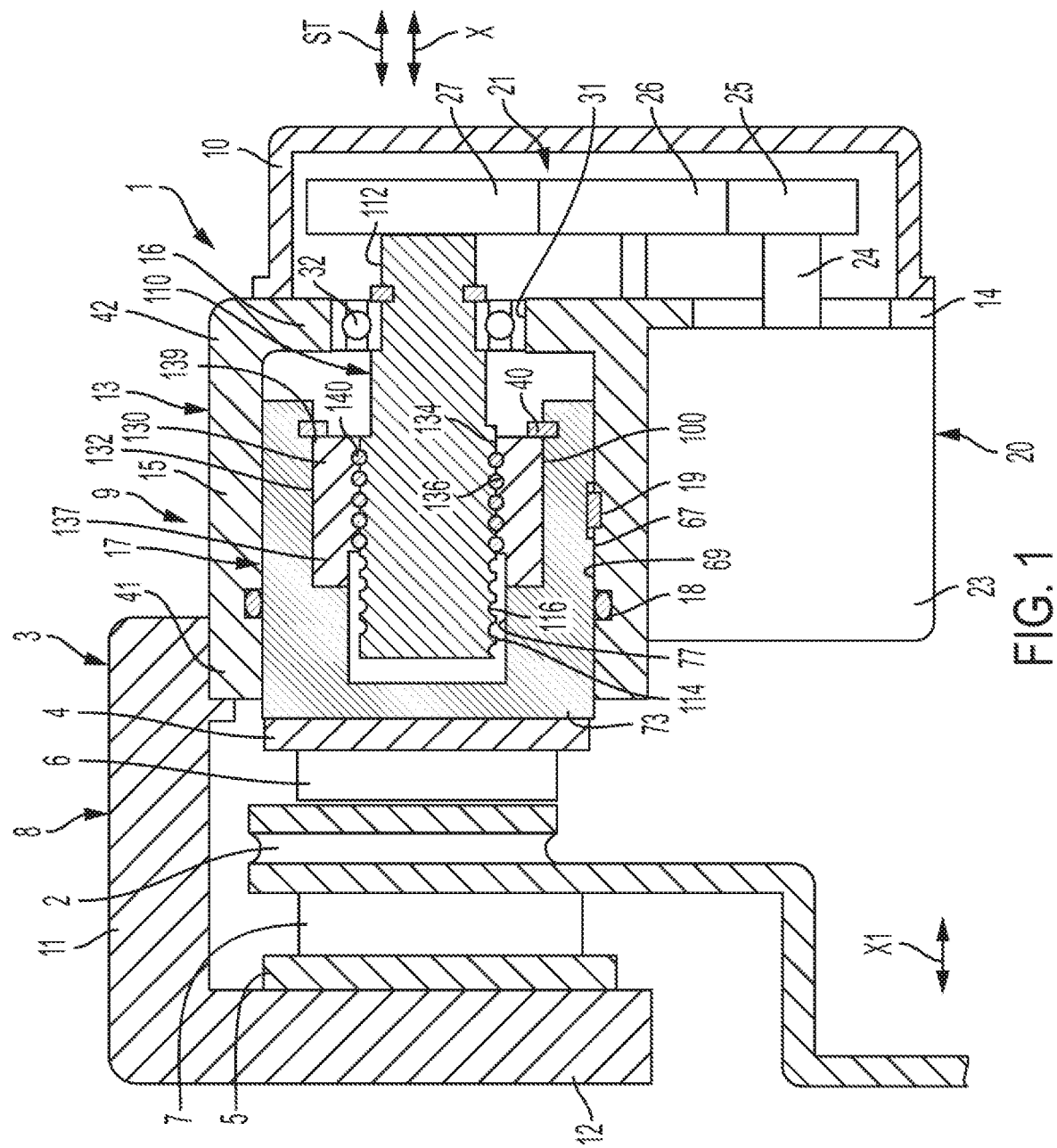
FIG. 1 is a schematic view of a brake assembly including an embodiment of a ball screw assembly in accordance with an embodiment of the present disclosure.

Repeat use of reference characters in the present specification and drawings is intended to represent same or analogous features or elements of the invention according to the disclosure.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Referring now to the drawings, FIG. 1 is a schematic sectional view of a brake assembly 1 including a ball screw assembly 100 in accordance with a first embodiment of the present disclosure. As shown, the brake assembly 1 selectively applies a frictional braking force to a disc 2 rotating integrally with a wheel of an automobile or the like. The brake apparatus 1 includes a caliper 3, a first backup plate 4 and a second backup plate 5, and a first pad 6 and a second pad 7. The caliper 3 is movably supported by a knuckle (not shown), and the first backup plate 4 and the second backup plate 5 are disposed on the caliper 3 so as to sandwich the brake disc 2 therebetween. The first pad 6 and the second pad 7 are fixed to the first backup plate 4 and the second backup plate 5, respectively, and can press respective side surfaces of the disc 2.

The caliper 3 includes a first body 8, a second body 9, and a cover 10. The first body 8 and the second body 9 are fixed together. The cover 10 is fixed to the second body 9. The first body 8 includes a body portion 11 and an arm portion 12. One end of the second body 9 is fixed to the body portion 11. The arm portion 12 is coupled orthogonally to the body portion 11. The second backup plate 5 is fixed to the arm portion 12. The second body 9 includes a brake cylinder 13 and an extension plate 14. The cylinder 13 is fixed to the body portion 11 of the first body 8. The extension plate 14 extends from the cylinder 13.

The cylinder 13 has a first end 41 and a second end 42 that are opposite to each other in an axial direction. The cylinder 13 includes a cylindrical portion 15 that is open at the first end 41 and an end surface plate 16 coupled to the second end 42 of the cylindrical portion 15. A piston 17 that is movable in the axial direction ST is housed in the cylinder 13. An end 73 of the piston 17 protrudes toward the disc 2 through an opening portion at an end of the cylinder 13 (that corresponds to the first end 41 of the cylindrical portion 15) and is fixed to the first backup plate 4.

A seal member 18 is interposed between a cylindrical outer surface 67 of the piston 17 and an inner surface of the cylinder 13 (that corresponds to an inner surface 69 of the cylindrical portion 15) to seal the gap between the outer surface 67 and the inner surface 69. The seal member 18 may be an O-ring housed in a housing groove formed in the inner surface 69 of the cylinder 13. The outer surface 67 of the piston 17 and the inner surface 69 of the cylinder 13 are coupled together via a key 19 provided in keyways formed in the outer surface 67 and the inner surface 69. Key coupling using the key 19 allows movement of the piston 17 in the axial direction ST to be guided and also allows rotation of the piston 17 with respect to the cylinder 13 to be regulated.

A hydraulic pressure that biases the piston 17 toward the disc 2 may be supplied into the cylinder 13 through a hydraulic path not depicted in the drawings. In that case, the cylinder 13 and the piston 17 form a hydraulic actuator. The caliper 3 functions to press both of the pads 6 and 7 against the disc 2 to generate a braking force. The caliper 3 includes an electric motor 20, a speed reduction apparatus 21, and the ball screw apparatus 100. The speed reduction apparatus 21 reduces the rotation speed of the electric motor 20. The ball screw apparatus 100 converts rotary motion transmitted from the electric motor 20 via the speed reduction apparatus 21 into linear motion of the piston 17 in the axial direction ST.

The electric motor 20 includes a motor housing 23 and an output shaft 24. The motor housing 23 is fixed to the extension plate 14 of the second body 9. The speed reduction apparatus 21 includes a driving gear 25, an idle gear 26, and a driven gear 27. The driving gear 25 is attached to one end of the output shaft 24 of the electric motor 20 so as to rotate together with the output shaft 24. The idle gear 26 meshes with the driving gear 25. The driven gear 27 meshes with the idle gear 26. The idle gear 26 is pivotally supported by the second body 9 so as to be rotatable. The cover 10 is fixed to the second body 9 so as to cover the speed reduction apparatus 21.

The ball screw apparatus 100 includes a ball screw shaft 110 and a ball nut 130. The ball screw shaft 110 is an input member. The ball nut 130 is a rotatable output member screwed on the ball screw shaft 110 via a plurality of main balls 140. The ball screw shaft 110 is inserted through the ball nut 130. The ball screw shaft 110 is supported by the second body 9 so as to be immovable in the axial direction but to be rotatable. The ball nut 130 is supported by the second body 9 so as to be movable in the axial direction and to be non-rotatable.

Specifically, the ball screw shaft 110 is supported by a rolling bearing 32 held in a support hole 31 formed in the end surface plate 16 of the cylinder 13 such that the ball screw shaft 110 is rotatable and immovable in the axial direction (axial direction ST). The driven gear 27 is coupled to an end 112 of the ball screw shaft 110 so as to rotate together with the ball screw shaft 110. As shown, the ball nut 130 has a cylindrical outer surface 132 and an inner surface 134. A ball track 136 is formed in the inner surface 134. The ball screw shaft 110 has a cylindrical outer surface 114 in which a ball track 116 is formed. The main balls 140 forming a train are disposed in a ball raceway 150 (FIG. 4) defined between ball track 116 and ball track 136.

The outer surface 132 of the ball nut 130 also includes a rotation regulation portion (not shown). The rotation regulation portion is engaged with a rotation regulation portion (not shown) of an inner surface 77 of the piston 17. The outer surface 132 of the ball nut 130 is fitted within a cylindrical inner surface portion of the piston 17. The engagement between the rotation regulation portions regulates rotation of the piston 17 and the ball nut 130 with respect to each other. The ball nut 130 includes a first end 137 closer to the disc 2 and a second end 139 that is on the opposite side from the first end 137, in a ball nut axial direction X. A retaining ring (annular member) 40 fitted in an annular groove formed in the inner surface 77 of the piston 17 is engaged with an end surface of the second end 139 of the ball nut 130. Thus, the piston 17 and the ball nut 130 are coupled together so as to move together in the axial direction ST (ball nut axial direction X).

When rotation of the output shaft 24 of the electric motor 20 is transmitted to the ball screw shaft 110 via the speed reduction apparatus 21 to rotate the ball screw shaft 110, the ball nut 130 moves in the ball nut axial direction X (axial direction ST). At this time, the piston 17 is guided by the key 19 and moves together with the ball nut 130 in the axial direction ST.

Figure 2:
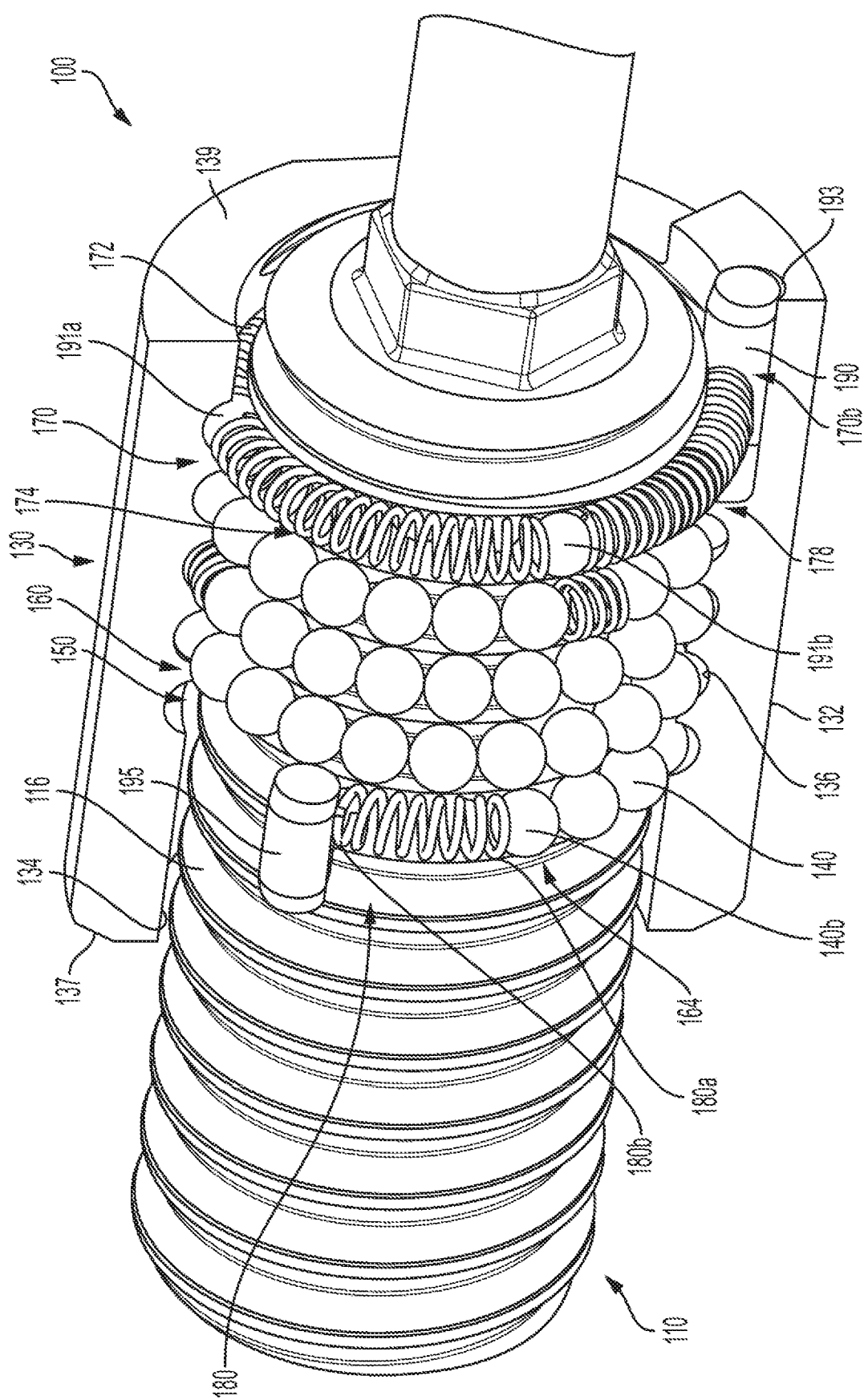
FIG. 2 is a perspective, partial cross-sectional view of the ball screw assembly shown in FIG. 1.
Figure 3:
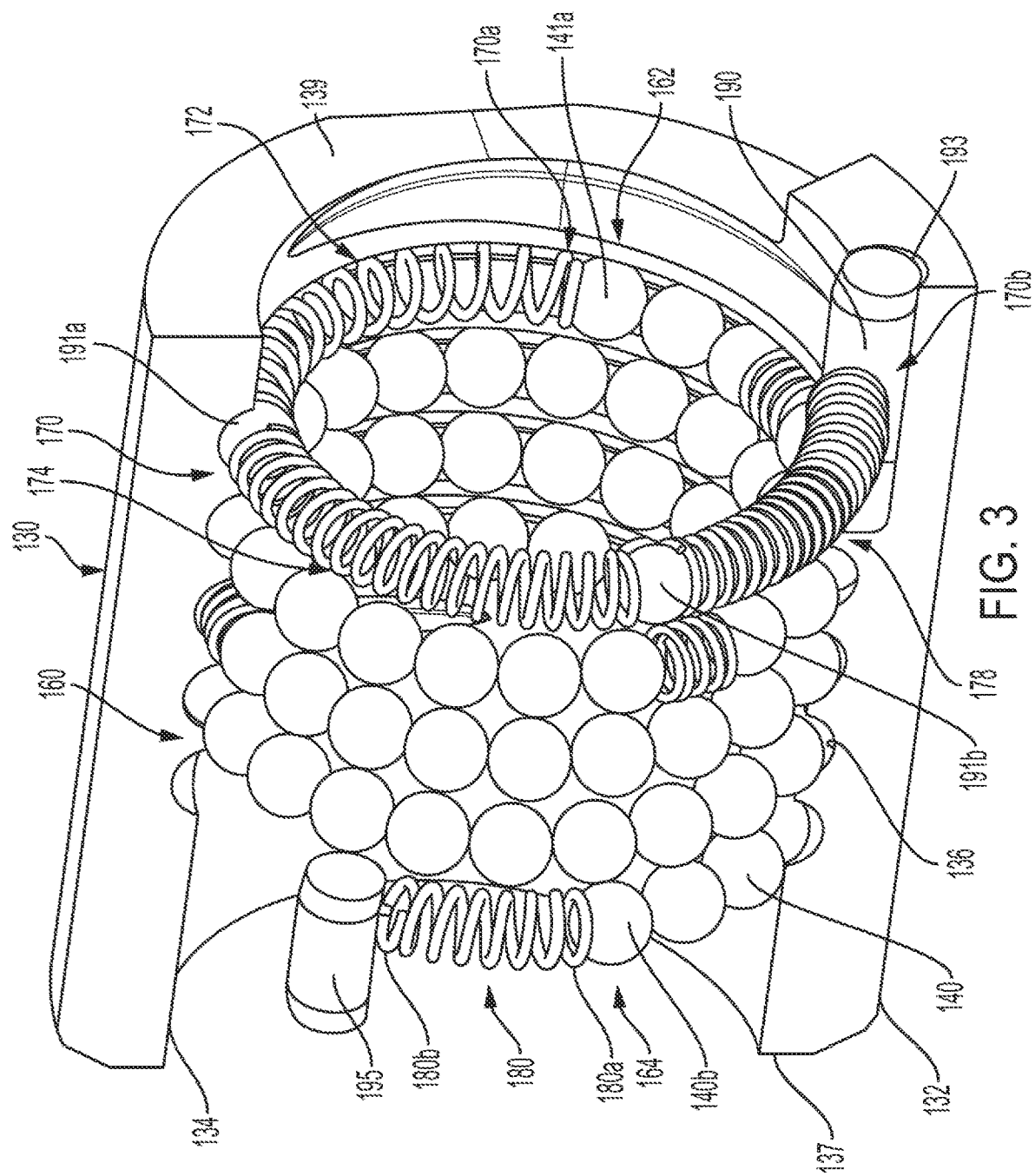
FIG. 3 is a perspective, cross-sectional view of the ball nut of the ball screw assembly shown in FIG. 1, including the ball train and spring assembly.
Figure 4:
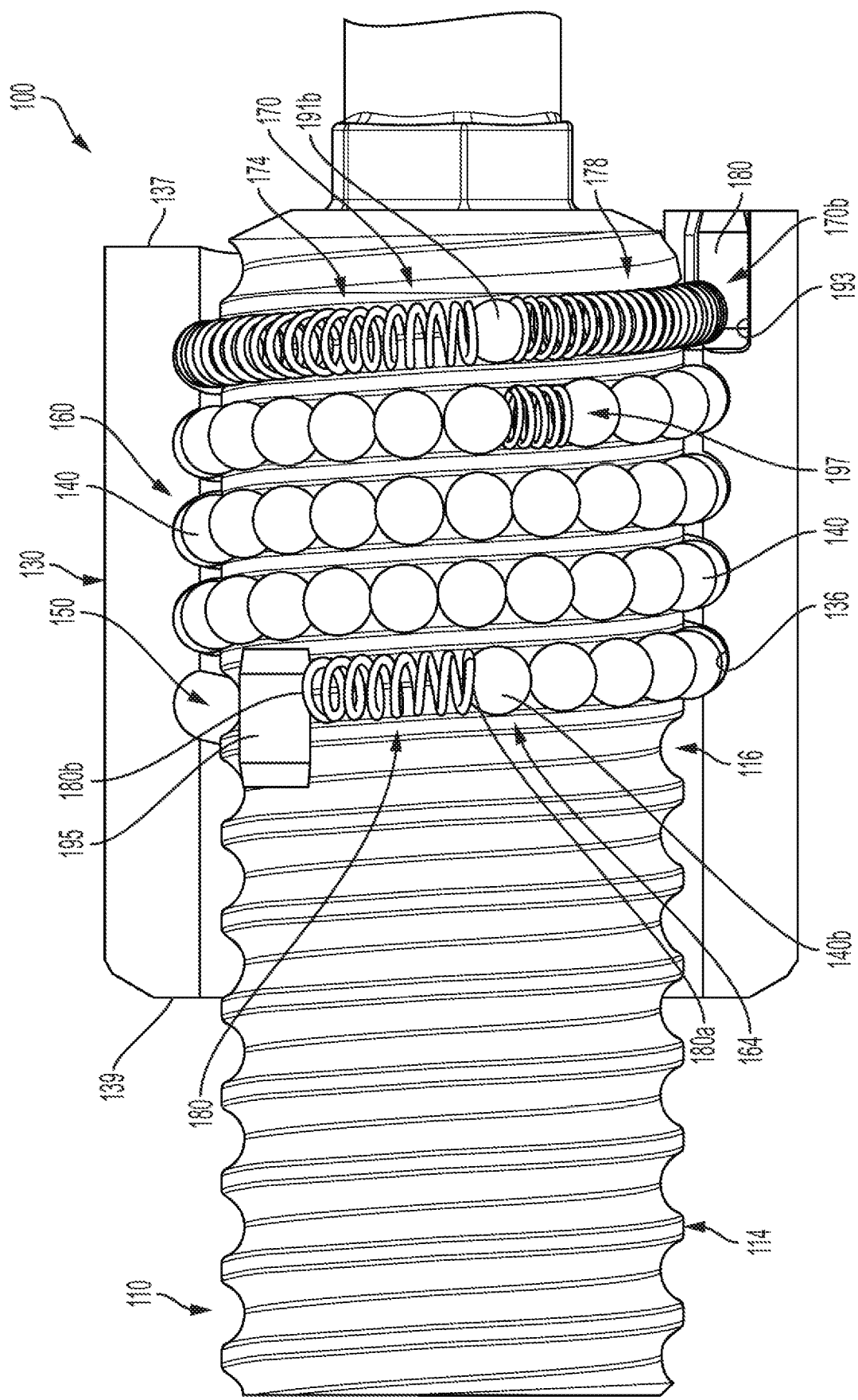
FIG. 4 is a side plan, partial cross-sectional view of the ball screw assembly shown in FIG. 1.

As best seen in FIGS. 2-4, the main balls 140 held in the ball raceway 150 form a ball train 160. The ball train 160 includes a first end 162 (FIG. 4) and a second end 164. As shown, one or more link springs 197 may be disposed between adjacent main balls 140 of the ball train 160. The ball screw apparatus 100 includes a main coil spring assembly 170 and a return coil spring 180 disposed on the respective opposite sides of the ball train 160 in the raceway 150.

Figure 5:
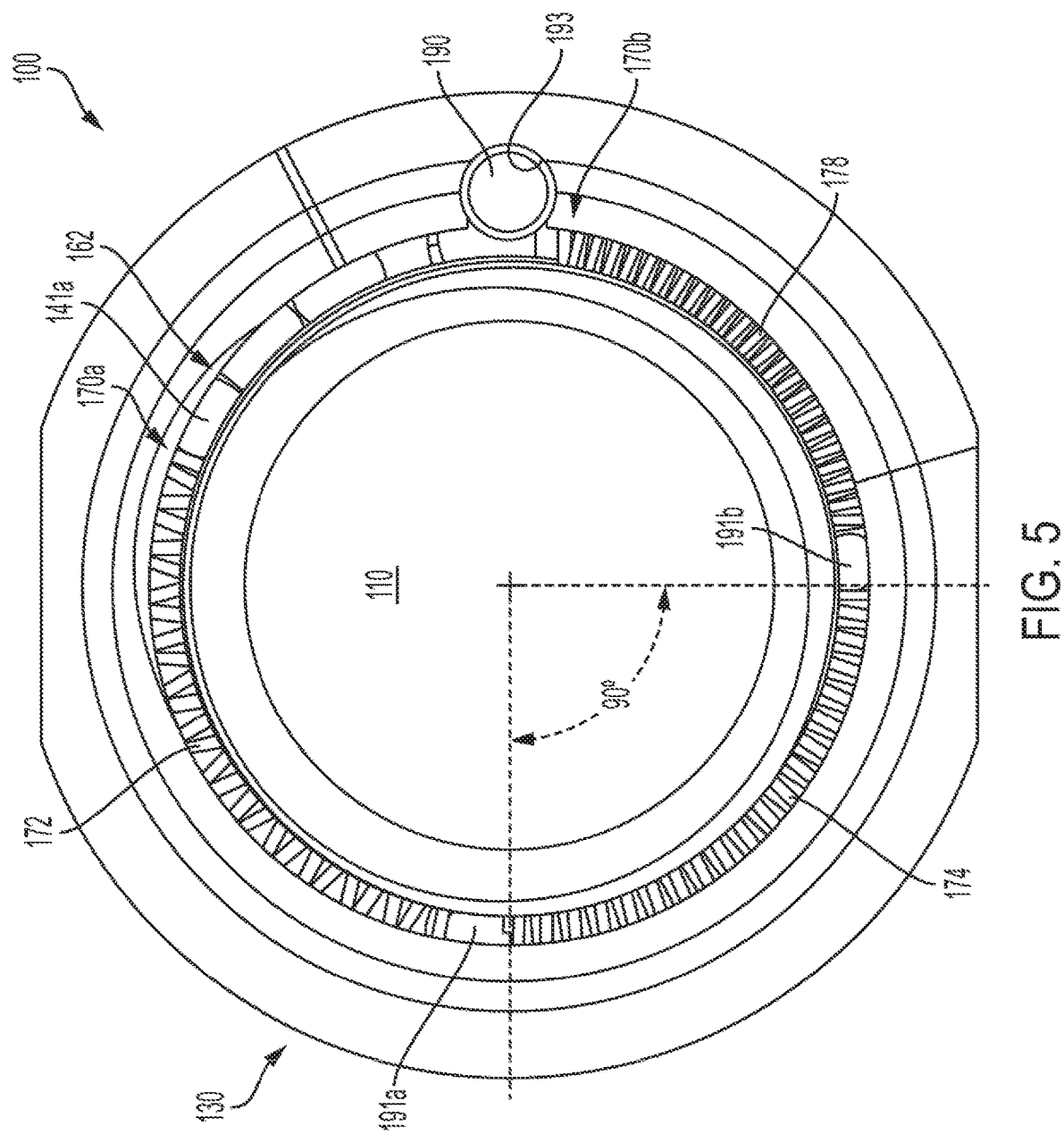
FIG. 5 is an end view of the ball screw assembly shown in FIG. 1.

As best seen in FIGS. 3 and 5, the main coil spring assembly 170 includes a first end 170a and a second end 170b. The first end 170a engages with a main ball 140a at a first end 162 of the ball train 160. The second end 170b of the main spring assembly 170 engages with a stopper pin 190 that is received in a recess 193 formed in ball nut 130 so that stopper pin 190 extends into ball raceway 150. A return coil spring 180 includes a first end 180a and a second end 180b. The first end 180a engages with a main ball 140b at the second end 164 of the ball train 160. The second end 180b of the return spring 180 engages with a stopper pin 195 that is received in a recess (not shown) that is formed in the ball nut 130 so that stopper pin 195 extends into ball raceway 150. Note, in alternate embodiments, the ball screw apparatus 100 may include a pair of stopper balls (not shown) held in the recessed portions of the ball nut 130 rather than the stopper pins. Typically, stopper balls have diameters greater than the diameter of the main balls 140 so they do not fit entirely within the ball raceway. However, the diameter of a stopper ball may be the same as the diameter of the main ball 140 or may be smaller than the diameter of the main ball 140, dependent upon the configuration of the corresponding recesses and ball raceway 150.

Still referring to FIGS. 3 and 5, the main spring assembly 170 is preferably formed by a plurality of coil spring portions having varying spring constants in order to promote consistent spring compression across the length of the main spring assembly 170. As shown, main spring assembly 170 includes a first spring portion 172 having a first spring constant ($k_1$), a second spring portion 174 having a second spring constant ($k_2$), and a third spring portion 178 having a third spring constant ($k_3$). The first spring portion 172 is disposed adjacent the first end 162 of the ball train 160 and is separated from the second spring portion 174 by a first link ball 191a. The third spring portion 178 is disposed adjacent the stopper pin 190 and is separated from the second spring portion by a second link ball 191b. Link balls 191a and 191b facilitate the motion of spring portions 172, 174, and 178 within the raceway while reducing distortion.

To facilitate coil compression across the length of the main spring assembly 170, the spring portions 172, 174, and 178 are selected so that the first spring constant ($k_1$) is greater than the second spring constant ($k_2$), ($k_1>k_2$), and the second spring constant ($k_2$) is greater than the third spring constant ($k_3$), ($k_2>k_3$). As well, to help reduce friction between the first, second, and third coil spring portions 172, 174, and 178 and the ball nut 130, the circumferential lengths of the spring portions 172, 174, and 178 about the screw shaft 110 circumference are preferably limited to 90° or less when the ball screw assembly 100 is in an unloaded, neutral state (FIGS. 5 and 6A). Note, however, in alternate embodiments the circumferential length of the main spring portions may exceed 90°.

Figure 6C:
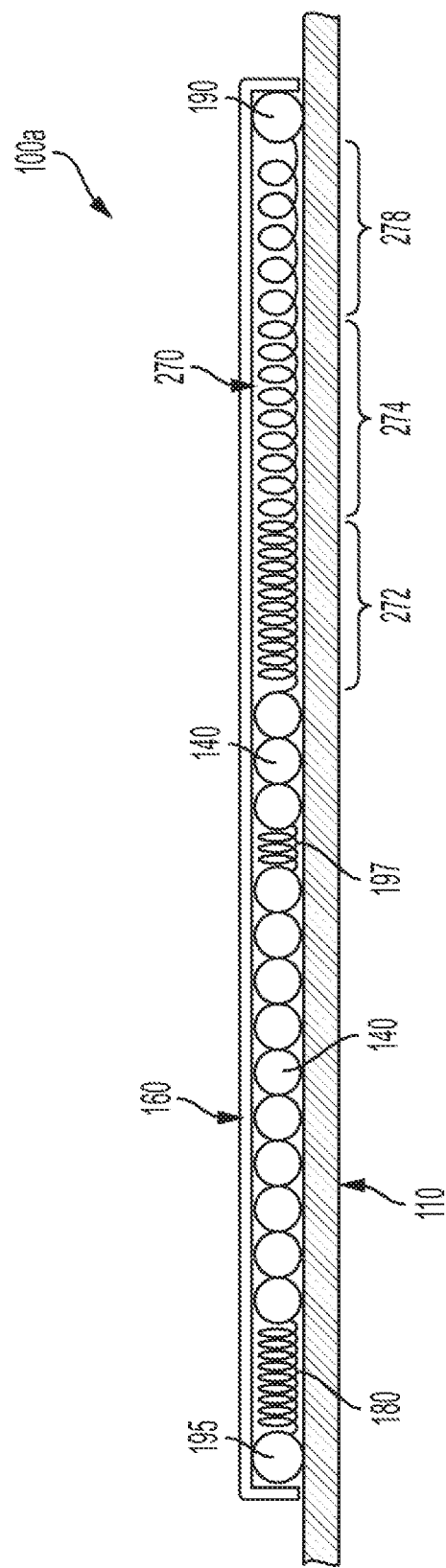
FIG. 6C is a schematic view of an alternate embodiment of a ball screw assembly in accordance with the present disclosure.

In operation, when the ball screw shaft 110 is rotationally driven with a low axial load imposed on the ball screw shaft 110, the first, second, and third spring portions 172, 174, and 178 of the main spring assembly 170 do not contact, as shown in FIG. 6A. Thus, the main balls 140 of the ball train 160 do not move relative to the ball nut 130. Therefore, the ball nut 130 moves with the main balls 140 of the ball train 160 sliding on the ball track 116. On the other hand, as shown in FIG. 6B, when the ball screw shaft 110 is rotationally driven with a high axial load imposed on the ball screw shaft 110 (arrow 199), the first, second, and third spring portions 172, 174, and 178 of the main spring assembly 170 contract as their coils are compressed. Thus, the ball nut 130 moves with the main balls 140 of the ball train 160 rolling with respect to both the ball nut 130 and the ball screw shaft 110. Consequently, efficient screw power transmission is achieved. Note, unlike known ball screw assemblies in which the coils of the main spring on the load end are compressed whereas the coils on the stopper end are not, compression occurs in the coils of each of the first, second, and third spring portions 172, 174, and 178 in the present disclosure. As noted above, this is accomplished by varying the spring constants dependent upon the position of each spring portion within the load path. By increasing the spring constant ($k_1$) of the first spring portion 172 on the load side (the ball train 160 side) and decreasing the spring constant ($k_3$) of the third spring portion 178 as the stopper side, the fatigue across all springs can be equalized or balanced. Note, when more than two individual spring portions are used to form the main spring assembly, the spring constant of each subsequent spring portion from the load end will be less than the spring constant of the spring portion that precedes it. For example, in the present example, the spring constant (kg) of the first spring portion 172 is greater than the spring constant ($k_2$) of the second spring portion 174, which is greater than the spring constant ($k_3$) of the third spring portion (178) ($k_1>k_2>k_3$). Note, in an alternate embodiment, a similar result may be achieved by using a single progressive rate main spring. For example, as shown in FIG. 6C, the main spring assembly 270 of ball screw assembly 100a is formed by a progressive rate spring including three portions 272, 274, and 278 having varying spring constants, similar to those of the spring portion 172, 174, and 178 discussed above for the first embodiment. As well, yet another embodiment may include a main spring assembly in which each individual main spring portion is a progressive rate spring portion.

While one or more preferred embodiments of the invention are described above, it should be appreciated by those skilled in the art that various modifications and variations can be made in the present invention without departing from the scope and spirit thereof. It is intended that the present invention cover such modifications and variations as come within the scope and spirit of the appended claims and their equivalents.

The invention claimed is:

1. A ball screw assembly comprising:
   a ball nut including a first end, a second end, an inner surface defining a central bore, and a ball track defined by the inner surface;
   a ball screw shaft including an outer surface defining a ball track, the ball screw shaft being disposed in the central bore so that the ball track of the ball nut and the ball track of the ball screw shaft form a ball raceway;
   a first stopper disposed at the first end of the ball nut within the ball raceway;
   a plurality of main balls forming a ball train, the ball train being disposed in the ball raceway; and
   a main spring assembly including a first spring portion and a second spring portion, the first spring portion and the second spring portion of the main spring assembly being disposed in the ball raceway between a first end of the ball train and the first stopper,
   wherein a length of the first spring portion is equal to a length of the second spring portion, a spring constant of the first spring portion is greater than a spring constant of the second spring portion, and one of the first spring portion and the second spring portion abuts the first stopper.

2. The ball screw assembly of claim 1, wherein the first stopper comprises one of a stopper ball and a stopper pin.

3. The ball screw assembly of claim 1, further comprising a link ball disposed between the first spring portion and the second spring portion of the main spring assembly.

4. The ball screw assembly of claim 1, further comprising:
a second stopper disposed in the ball raceway; and
a return spring disposed in the ball raceway between the second stopper and a second end of the ball train.

5. The ball screw assembly of claim 1, wherein the first spring portion and the second spring portion of the main spring assembly each extend circumferentially over a portion of the outer surface of the ball screw shaft that is less than 90°.

6. The ball screw assembly of claim 1, wherein the first spring portion is adjacent the first end of the ball train and the second spring portion is disposed between the first spring portion and the first stopper.

7. The ball screw assembly of claim 1, wherein the first spring portion and the second spring portion of the main spring assembly are each a coil spring.

8. The ball screw assembly of claim 1, wherein the first spring portion and the second spring portion are portions of a unity main spring.

9. The ball screw assembly of claim 8, wherein the main spring is a progressive rate spring.

10. A brake assembly comprising:
a caliper including an arm portion;
a piston disposed within the caliper, the piston being axially movable along a longitudinal center axis of the piston;
a first brake pad affixed to the arm portion of the caliper;
a second brake pad affixed to an end surface of the piston;
a brake disc disposed between the first brake pad and the second brake pad; and
a ball screw assembly comprising:
a ball nut including a first end, a second end, an inner surface defining a central bore, and a ball track defined by the inner surface;
a ball screw shaft including an outer surface defining a ball track, the ball screw shaft being disposed in the central bore so that the ball track of the ball nut and the ball track of the ball screw shaft form a ball raceway;
a first stopper disposed at the first end of the ball nut within the ball raceway;
a plurality of main balls forming a ball train, the ball train being disposed in the ball raceway; and
a main spring assembly including a first spring portion and a second spring portion, the first spring portion and the second spring portion of the main spring assembly being disposed in the ball raceway between a first end of the ball train and the first stopper,
wherein a length of the first spring portion is equal to a length of the second spring portion, a spring constant of the first spring portion is greater than a spring constant of the second spring portion, and one of the first spring portion and the second spring portion abuts the first stopper.

11. The brake assembly of claim 10 further comprising an electric motor having an output shaft, wherein the output shaft is operably connected to the ball screw shaft of the ball screw assembly.

12. The brake assembly of claim 11, further comprising a link ball disposed between the first spring portion and the second spring portion of the main spring assembly.

13. The brake assembly of claim 11, further comprising:
a second stopper disposed in the ball raceway; and
a return spring disposed in the ball raceway between the second stopper and a second end of the ball train.

14. The brake assembly of claim 11, wherein the first spring portion is adjacent the first end of the ball train and the second spring portion is disposed between the first spring portion and the first stopper.

15. The brake assembly of claim 11, wherein the main spring assembly further includes a third spring portion having a spring constant that is less than the spring constant of the second spring portion, the third spring portion being disposed between the second spring portion and the first stopper.

16. The brake assembly of claim 10, wherein the first spring portion and the second spring portion of the main spring assembly are each a coil spring.

17. The brake assembly of claim 10, wherein the first spring portion and the second spring portion are portions of a unity main spring.

18. The brake assembly of claim 17, wherein the main spring is a progressive rate spring.

* * * * *